(12) United States Patent
Skierski

(10) Patent No.: US 7,167,246 B1
(45) Date of Patent: Jan. 23, 2007

(54) METHOD OF COLOR MATCHING METALLIC PAINTS

(75) Inventor: Thomas J. Skierski, Brunswick Hills, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 731 days.

(21) Appl. No.: 10/619,370

(22) Filed: Jul. 11, 2003

Related U.S. Application Data

(60) Provisional application No. 60/395,873, filed on Jul. 12, 2002.

(51) Int. Cl.
*G01J 3/42* (2006.01)
(52) U.S. Cl. .................. 356/408; 356/402; 356/425; 356/319; 427/8; 427/10; 427/258
(58) Field of Classification Search ............... 356/408, 356/421, 425, 319, 300, 402; 427/258, 8, 427/10
See application file for complete search history.

(56) References Cited

U.S. PATENT DOCUMENTS

| | | | |
|---|---|---|---|
| 3,059,524 A | 10/1962 | Grassmann et al. ............ 88/14 |
| 3,368,864 A | 2/1968 | Gugerli ............................ 8/25 |
| 3,601,589 A | 8/1971 | McCarty ...................... 235/150 |
| 3,690,771 A | 9/1972 | Armstron, Jr. et al. ...... 356/176 |
| 3,758,842 A | 9/1973 | Kudlacik ...................... 322/25 |
| 4,093,991 A | 6/1978 | Christie, Jr. et al. ......... 364/525 |
| 4,887,217 A | 12/1989 | Sherman et al. ............. 364/468 |
| 5,003,500 A | 3/1991 | Gerber ......................... 364/526 |
| 5,116,408 A | 5/1992 | Crozer ........................... 106/19 |
| 5,231,472 A | 7/1993 | Marcus et al. ............... 356/402 |
| 5,387,977 A | 2/1995 | Berg et al. ................... 356/407 |
| 5,493,404 A | 2/1996 | Allaire et al. ................ 356/402 |
| 5,761,070 A | 6/1998 | Conners et al. ........ 364/478.11 |
| 6,166,814 A | 12/2000 | Pringle ......................... 356/445 |
| 6,287,377 B1 | 9/2001 | Binns et al. .................. 106/499 |
| 6,362,885 B1 | 3/2002 | Osumi et al. ................ 356/402 |
| 6,750,970 B1 * | 6/2004 | Masuda ........................ 356/402 |

OTHER PUBLICATIONS

S. Upton Jenkins, Consultant to Hunter Associates Laboratory, Inc., Reston, Va., "Batch Color Correction By Tristimulus Colorimeter", Modern Paint and Coatings, Sep. 1980, pp. 41-44.

Marshall M. Lih, Catholic University of America, "Color Technology", Chemical Engineering, Aug. 12, 1968, pp. 146-156.

A. B. J. Rodrigues, E. I. DuPont de Nemours & Company, Troy, Michigan, USA, Fifth International Conference In Organic Coatings Science and Technology, vol. 3—Advances in Organic Coatings Science and Technology Series, Theory & Implementation Of Modern Techniques Of Color Conception, Matching And Control, pp. 271-282.

"The Kubelka-Munk Theory of Reflectance", pp. 1-6.

Eugene Allen, "Matrix Algebra for Colorimetrists", 6 pages.

Charles Poynton, "Poynton's Color FAQ", Copyright Feb. 27, 1997 [f], 22 pages.

* cited by examiner

*Primary Examiner*—Layla G. Lauchman
(74) *Attorney, Agent, or Firm*—Robert E. McDonald; Vivien Y. Tsang; Paul R. Katterle

(57) ABSTRACT

A process for color matching a metallic paint by taking a color measurement reading at a single angle using a regular spectrophotometer or colorimeter is provided. The preferred type of metallic pigment to be utilized in preparing the matching color can be selected by microscopic evaluation of the metallic pigment in the target metallic paint to identify its size, shape and probable composition.

4 Claims, 1 Drawing Sheet

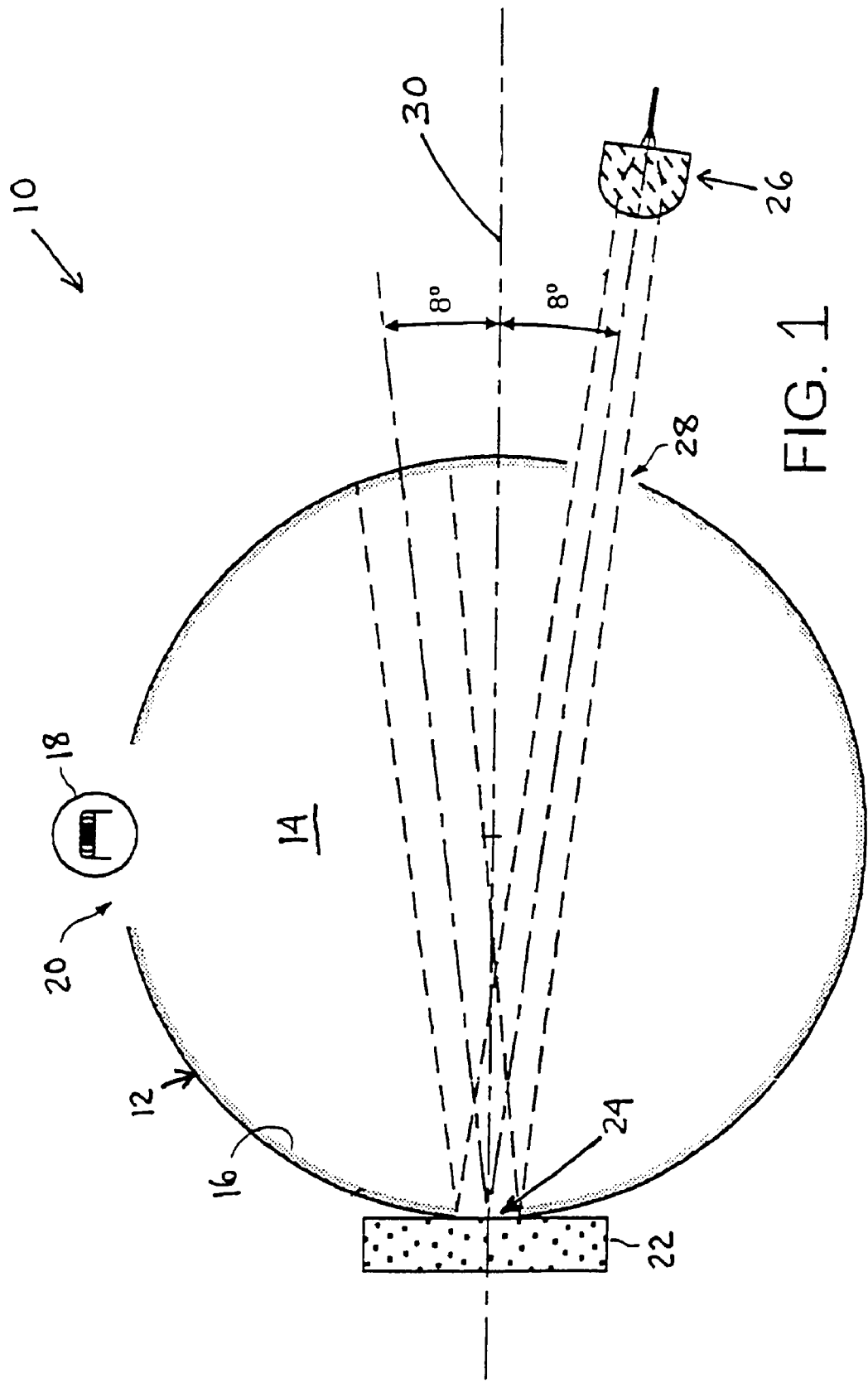

# METHOD OF COLOR MATCHING METALLIC PAINTS

CROSS-REFERENCE TO RELATED APPLICATION

This application claims the benefit of U.S. Provisional Application No. 60/395,873 filed Jul. 12, 2002, the entire disclosure of which is hereby incorporated by reference.

BACKGROUND OF THE INVENTION

The present invention relates to color matching of paint and, more specifically, to color matching metallic paints.

Paints containing light-reflecting particles, such as metal flake (such paints hereinafter being referred to as "metallic paints") are widely used in certain application fields. Metallic paints exhibit a change in lightness or color when they are viewed at different angles. This change in lightness or color (which is commonly referred to as "flop") is desirable for certain products, such as automobiles, because it accentuates the contours of the product. Unfortunately, this change in lightness or color makes color matching of metallic paints more difficult. It is generally believed that a quality color measurement of a metallic paint cannot be obtained by taking a color measurement reading of the metallic paint at a single angle using a regular spectrophotometer or calorimeter. Therefore, when color matching a metallic paint, it is conventional practice to take color measurements of the metallic paint at a plurality of different angles (usually at least three) using a goniospectrophotometer.

The present invention, however, is directed to a method for accurately color matching a metallic paint using a regular spectrophotometer that takes a color measurement reading of the metallic paint at a single angle.

BRIEF DESCRIPTION OF THE DRAWINGS

The features, aspects, and advantages of the present invention will become better understood with regard to the following description, appended claims, and accompanying drawings where:

FIG. 1 is a schematic view of a portion of a single angle spectrophotometer for use in the method of the present invention.

DETAILED DESCRIPTION OF THE PREFERRED EMBODIMENTS

The present invention is directed to a method of color matching metallic paint. The method utilizes a single angle spectrophotometer 10 connected to a personal computer with a central processing unit. As shown in FIG. 1, the spectrophotometer 10 may have an integrating sphere 12 defining a cavity 14 with a highly reflective, optically diffuse surface 16. A light source 18 connected to the cavity 14 via a lamp port 20 illuminates the cavity 14 to diffusely illuminate a specimen 22 at a specimen port 24. A receiver 26 is positioned at a receiver port 28 to receive optical radiation from the specimen 22. The receiver 26 may be positioned normal to the specimen 22, along the diameter of the sphere 12, or, more preferably, at angle of up to 10°, more preferably about 8° from the specimen normal 30. The receiver 26 conveys the reflected light from the specimen 22 to a light analyzer (not shown). The light analyzer also receives reference light from the light source, which is used to correct for variations in the intensity of the light source. The light analyzer includes a device for separating light into its component wavelengths, such as a diffraction grading or a prism, and an array of detectors to measure the intensities of the different wavelengths. Signals from the detector array are multiplexed and fed to a data processor (not shown), which produces digital signals that are conveyed to the personal computer.

A commercially-available single angle spectrophotometer that may be used in the present invention is the ColorEye 7000 color spectrophotometer sold by Gretag Macbeth.

The present invention utilizes a library or collection of different types of metallic pigments and a library or collection of different types of colorants. In one embodiment of the present invention, the metallic pigment library comprises eight different types of metallic pigments and the colorant library comprises 10 different colorants. The metallic pigments can be composed of aluminum or other types of metal, and can have a variety of different shapes, such as a cornflake-type shape or a silver dollar-like shape. The colorant library include a black colorant and a plurality of non-black colorants. Examples of non-black colorants that may be used include phthalo blue, phthalo green and yellow and red oxides. The colorant library does not include a white colorant.

Each of the metallic pigments is mixed into a vehicle (binder and thinner) to form a metallic masstone. The metallic masstones are applied to panels and allowed to dry. The panels are then viewed by an observer for brightness. The metallic pigment that produces the greatest brightness is selected as the standard metallic pigment. The standard metallic pigment is, in essence, used like a white colorant in conventional color matching procedures.

The standard metallic pigment is mixed with each one of the non-black colorants in a vehicle to form a plurality of binary metallic characterization mixtures. The black colorant is mixed with the standard metallic pigment in a vehicle to form a binary black metallic characterization mixture. The black colorant is also mixed with each of the non-black colorants in a vehicle to form a plurality of binary black characterization mixtures. In addition, a black masstone is formed from the black colorant. For each of the metallic characterization mixtures and for the black metallic characterization mixture, the standard metallic pigment is added to the colorant until the standard metallic pigment just becomes visible. The concentration of the standard metallic pigment $C_{sm}$ and the concentration of the non black colorant $C_{ci}$ and the concentration of the black colorant $C_{bk}$ are noted and recorded for each of the metallic characterization mixtures and for the black metallic characterization mixture. For each of the black characterization mixtures, the non-black colorant is added to the black colorant until the non-black colorant just becomes visible. The concentration of the black colorant $C_{bk}$ and the concentration of the non-black colorants $C_{ci}$ are noted and recorded. The masstone of the standard metallic pigment, the black masstone, the metallic characterization mixtures, the black metallic characterization mixture and the black characterization mixtures are all applied to panels and allowed to dry. Reflectance measurements of the dried panels are then made using the spectrophotometer 10. The reflectance measurements are made at 10 to 20 nanometer intervals along the visible light spectrum, which extends from about 400 nanometers to about 700 nanometers.

The spectral characteristics of the standard metallic pigment, the black colorant and the non-black colorants are determined from the reflectance measurements using the Kubelka-Munk Theory. The Kubelka-Munk Theory relates reflectance at complete hiding (R∞) of a pigmented film at a specific wavelength to two optical constants, K (the absorption coefficient) and S (the scattering coefficient). After some basic assumptions, the Kubelka-Munk Theory can be expressed by the following equation:

$$\frac{K}{S} = \frac{(1-R_\infty)^2}{2R_\infty} \quad \text{[equation 1]}$$

One of the assumptions behind the Kubelka-Munk equation that is not valid is that there is no reflection on the upper surface of the film. This is not possible because of the refractive index difference at the air/paint film interface. This invalid assumption, however, can be accounted for by using the Saunderson correction:

$$R_m = k_1 + (1-k_1)(1-k_2)\frac{R}{1-k_2 R} \quad \text{[equation 2]}$$

where
$R_m$=measured reflectance
R=true Kubelka-Munk reflectance
$k_1$=external reflectance coefficient
$k_2$=internal reflectance coefficient An important aspect of the Kubelka-Munk Theory is that the absorption coefficients and the scattering coefficients are additive quantities. For a paint film where i denotes the ith component of a mixture of N colorants and where $C_i$ is the concentration of the ith colorant, the absorption and scattering coefficients of the mixture are:

$$K = \sum_{i=1}^{N} C_i K_i \quad \text{[equations 3a \& 3b]}$$

$$S = \sum_{i=1}^{N} C_i S_i$$

Also:

$$\frac{K}{S} = \frac{K = \sum_{i=1}^{N} C_i K_i}{S = \sum_{i=1}^{N} C_i S_i} \quad \text{[eqaution 4]}$$

The reflectance measurements for the masstone of the standard metallic pigment, the black metallic characterization mixture and the black masstone are used to calculate the K and S values for the standard metallic pigment and the black colorant by solving the equations set forth above, wherein equation 1 with the correction of equation 2 is used for the black masstone and the masstone of the standard metallic pigment and wherein equations 1 and 4 (with the correction of equation 2) is used for the black characterization mixture, with the concentration of the black colorant $C_{bk}$ and the concentration of the standard metallic pigment $C_{sm}$ being used for $C_i$. These K and S values are stored in a database of a software program installed on the personal computer.

For each non-black colorant, the reflectance measurements for its metallic characterization mixture and its black characterization mixture are used to calculate the K and S values for the non-black colorant by solving equations 1 and 4 (with the correction of equation 2) for the metallic characterization mixture and the black characterization mixture, with the concentration of the black colorant $C_{bk}$, the concentration of the standard metallic pigment $C_{sm}$ and the concentration of the non-black colorant $C_{ci}$ being used for $C_i$. These K and S values are stored in the database of the software program installed on the personal computer.

Once the spectral characteristics (i.e., the K and S values) of the black colorant, the standard metallic pigment and the non-black colorants have been determined and entered into the database of the software program, the spectrophotometer 10 and the software program may be used to formulate a batch of metallic paint having a color matching a metallic target paint.

First, the target paint is analyzed with a microscope to determine the type of light-reflecting particles that are used therein. Once the type of light-reflecting particle is determined, a metallic pigment closest to this type of light-reflecting particle is selected from the library of metallic pigments and is noted.

The formula of the batch paint (ex colorants and pigments) describing the proportions of binder, solvents and other additives that are required to make the batch paint is entered into the software program. The amount of the batch paint that is desired is also entered into the software program. The number of colorants to be used and the selected metallic pigment (based on the microscopic analysis of the target paint) are entered into the software program as well. Additionally, the permissible color tolerance (i.e., the allowable variation from standard, typically called ΔE) for the batch paint is provided to the computer.

The number of colorants is selected based on the color of the target paint. Normally, a 3 colorant formula is selected. If, however, the target paint has a difficult to match color, such as a bronze tone, a violet color, a very saturated dark color, or a highly chromatic color, a 4 colorant formula may be selected. With a 3 colorant formula, the selected metallic pigment and 3 colorants are used in the color matching and with a 4 colorant formula, the selected metallic pigment and 4 colorants are used in the color matching. Once again, no white colorants are used in the color matching. The black colorant may also be forced out of the color matching, depending on the color of the target paint.

The spectrophotometer 10 is used to measure the target paint's spectral curve, which is a plot of reflectance versus wavelength. The spectrophotometer 10 determines the spectral curve of the target paint through the visible light spectrum of 400–700 nanometers (nm) at 10–20 nm increments and calculates the X, Y and Z tristimulus values for the paint based on this data according to the formulas:

$$X = \sum_{\lambda} E R_x$$

$$Y = \sum_{\lambda} E R_y$$

$$Z = \sum_{\lambda} E R_z$$

where E is the relative energy of a standard light source, R is the reflectance of the target paint and x, y, z are the color mixture functions for a specified observer. The amount of the colorants and the selected metallic pigment that must be added to provide the batch paint with a color falling within the color tolerance value is determined based on mathematical calculations run by the software program in the personal computer.

The mathematical procedures utilized to calculate the amount of the colorants and the selected metallic pigment to be added based upon a difference in X, Y and Z readings are well known in the art. A particularly useful procedure is that described in Eugene Allen's article in the Journal of the Optical Society of America, Volume 64, Number 7, July 1974 pages 991 to 993 the teaching of which is hereby incorporated by reference. A procedure based on Eugene Allen's method similar to the one used herein is described in U.S. Pat. No. 4,887,217 to Sherman et al., which is assigned to the assignee of the present application and which is hereby incorporated by reference. For a colorant having a given concentration, absorption coefficient and scattering coefficient, this calculation provides a determination of the amount of said colorant which must be added to adjust the X, Y, Z readings from one value to another.

In the preferred application of this approach, the mathematical technique is first applied to the batch paint in a prediction stage to determine, by an iterative process, the quantities of the colorants and the selected metallic pigment that must be added to the batch paint to theoretically match the X, Y and Z values of the target paint. In a correction stage, the mathematical technique is again applied in an iterative process to determine the amount (if any) of the colorants and the selected metallic pigment necessary to move from the color of the produced batch paint to the desired color of the target paint.

The mathematical equations for this type of calculation are set forth below. The equations assume three colorants and the selected metallic pigment are charged into the batch paint being produced and subsequently shading with three of the colorants and the selected metallic pigment. In the equations below and in the description thereof, the colorants and the selected metallic pigment are collectively referred to as "colorants", unless expressly indicated otherwise.

$$c = \text{pigment concentration vector} = \begin{bmatrix} c_1 \\ c_2 \\ c_3 \end{bmatrix}$$

$$= (TE\{D_k \Phi_k - k^{(4)}u] + D_s[\Phi_s - s^{(4)}u]\})^{-1} \cdot TE\{D_k(k^{(a)} - k^{(4)}] + D_s[s^{(a)} - s^{(4)}]\}$$

where $$T = \begin{bmatrix} X_{400} & X_{420} & \ldots & X_{700} \\ Y_{400} & Y_{420} & \ldots & Y_{700} \\ Z_{400} & Z_{420} & \ldots & Z_{700} \end{bmatrix} = \begin{array}{l} \text{color mixture function for a specified observer} \\ \text{(available from publised references)} \end{array}$$

$$E = \begin{bmatrix} E_{400} & 0 & \ldots & 0 \\ 0 & E_{420} & \ldots & 0 \\ \ldots & \ldots & \ldots & \ldots \\ 0 & 0 & \ldots & E_{700} \end{bmatrix} = \begin{array}{l} \text{relative spectral energy distribution of a specified light source} \\ \text{(available from publised references)} \end{array}$$

$$D_k = \begin{bmatrix} \left(\frac{\partial R}{\partial K}\right)_{400} & 0 & \ldots & 0 \\ 0 & \left(\frac{\partial R}{\partial K}\right)_{420} & \ldots & 0 \\ \ldots & \ldots & \ldots & \ldots \\ 0 & 0 & \ldots & \left(\frac{\partial R}{\partial K}\right)_{700} \end{bmatrix} = \begin{array}{l} \text{matrix describing partial deriative of reflectance} \\ \text{with respect to absorbance at each wavelength} \end{array}$$

where $\left(\frac{\partial R}{\partial K}\right)_i = -2R_1^{2/}[S_r(I - R_1^2)]$ = reflectance of color at $i$ = scattering of color at $i$ $$D_s = \begin{bmatrix} \left(\frac{\partial R}{\partial S}\right)_{400} & 0 & \ldots & 0 \\ 0 & \left(\frac{\partial R}{\partial S}\right)_{420} & \ldots & 0 \\ \ldots & \ldots & \ldots & \ldots \\ 0 & 0 & \ldots & \left(\frac{\partial R}{\partial S}\right)_{700} \end{bmatrix} =$$

matrix describing partial deriative of reflectance
with respect to absorbance at each wavelength where $$\left(\frac{\partial R}{\partial S}\right)_i = R_i[1-R_i]/[S_r(1+R_i)] \quad 5$$

$$\Phi_k = \begin{bmatrix} K_{400}^{(1)} & K_{400}^{(2)} & K_{400}^{(3)} \\ K_{420}^{(1)} & K_{420}^{(2)} & K_{420}^{(3)} \\ \cdots & \cdots & \cdots \\ K_{700}^{(1)} & K_{700}^{(2)} & K_{700}^{(3)} \end{bmatrix} =$$

absorption coefficient of the three colorants
(from the colorant characterization procedure described above)

$$\Phi_s = \begin{bmatrix} S_{400}^{(1)} & S_{400}^{(2)} & S_{400}^{(3)} \\ S_{420}^{(1)} & S_{420}^{(2)} & S_{420}^{(3)} \\ \cdots & \cdots & \cdots \\ S_{700}^{(1)} & S_{700}^{(2)} & S_{700}^{(3)} \end{bmatrix} =$$

scattering coefficient of the three colorants
(from the colorant characterization procedure described above)

$$k^{(4)} = \begin{bmatrix} K_{400}^{(4)} \\ K_{420}^{(4)} \\ \vdots \\ K_{700}^{(4)} \end{bmatrix} \quad s^{(4)} = \begin{bmatrix} S_{400}^{(4)} \\ S_{420}^{(4)} \\ \vdots \\ S_{700}^{(4)} \end{bmatrix} u[111]$$

where $$S_i^{(a)} = \Phi_s c - s^{(4)}(1 - C_1 - C_2 - C_3)$$

$$K_1^{(a)} = S_i^{(a)}(1-R_i)^2/2R_i$$

$$\Delta c = (TE\{D_k[\Phi_k - k^{(4)}u] - D_r[\Phi_r - s^{(4)}u]\}) - l_{\Delta t}$$

where $\Delta t$ is a vector $$\begin{bmatrix} \Delta X \\ \Delta Y \\ \Delta Z \end{bmatrix}$$

Representing the differences between the calculated batch paint X, Y and Z values and the values of X, Y and Z that would be required to produce the spectral curve of the target paint.

$$R_i^{(a)} = \frac{1}{1+\left(\frac{K_i^{(a)}}{s_i^{(a)}}\right)+\sqrt{\left(\frac{K_i^{(a)}}{s_i^{(a)}}\right)^2+2\left(\frac{K_i^{(a)}}{s_i^{(a)}}\right)}}$$

These equations are conveniently utilized in the following manner:

A. As a first step, a rough color match of the batch paint is calculated, then an iterative calculation corrects the rough match to correspond to the target paint colors by:

(1) Forming matrices T, E, u, $\phi_k$, $\phi_s$, k(4) and s(4);
(2) Calculate a rough match to the target paint by calculating $K_i^{(a)}$ and $S_i^{(a)}$ from the batch paint formula;
(3) Utilize these $K_i^{(a)}$ and $S_i^{(a)}$ values to calculate $R_i^{(a)}$;
(4) Utilizing these values calculate the c matrix;
(5) Calculate $\Delta E$ according to the Friele-MacAdam-Chickering color difference equation:

$$\Delta E = [(\Delta C_{FMC})^2 + \Delta L^2]^{1/2}$$

Where $\Delta C_{FMC} = K_1 \Delta C_1$, and $\Delta L = K_2 \Delta L_2$, $$\Delta C_1 = \left[(\Delta C_2/a)^2 + (\Delta C_{yb}/b)^2\right]^{\frac{1}{2}}$$

$$\Delta L_1 = (P\Delta P + Q\Delta Q)/(P^2+Q^2)^{\frac{1}{2}}$$

$$\Delta C_{,2} = (Q\Delta P - P\Delta Q)/(P^2+Q^2)^{\frac{1}{2}}$$

$$\Delta C_{ya} = S\Delta L_1/(P^2+Q^2)^{\frac{1}{2}} - \Delta S$$

$$\Delta L_2 = 0.279 \Delta L_1/a$$

$$K_1 = 0.55669 - 0.049434Y - 0.82575 \cdot 10^{-3}Y^2 + 0.79172 \cdot 10^{-5}Y^{-3} - 0.30087 \cdot 10^{-7}Y^4.$$

$$K_2 = 0.17548 - 0.027556Y - 0.57262 \cdot 10^{-3}Y^2 + 0.63893 \cdot 10^{-5}Y^3 - 0.26731 \cdot 10^{-7}Y^4.$$

$$a^2 = 17.3 \cdot 10^{-6}(P^2+Q^2)/(1+(2073P^2Q^2)(P^4+Q^4)1,$$

$$b^2 = 3.098 \cdot 10^{-4}(S^2 + 0.2015Y^2)$$

$$P = 0.724X - 0.382Y - 0.098Z$$

$$Q = -0.48X + 1.37Y + 0.1276Z$$

$$S = 0.686Z$$

where $\Delta P = 0.724(X_{rm} - X_{dt}) + 0.382(Y_{rm} - Y_{dt}) - 0.098(Z_{rm} - Z_{dt})$ $$\Delta Q = -0.48(X_{rm} - X_{dt}) + 0.382(Y_{rm} - Y_{dt}) + 0.1276(Z_{rm} - Z_{dt})$$

$$\Delta S = 0.686(Z_{rm} - Z_{dt})$$

Where the subscript rm identifies the tristimulus readings of the rough match and the subscript dt identifies the target paint tristimulus values.

(6) If $\Delta E$ is sufficiently small, e.g. less than or equal to 0.1, no further iteration is necessary. If not, then iterate by generating the new values of $K_i$, $S_i$ and $R_i$ and calculate the tristimulus values of this new match t=TER and again calculate ΔE. This process can be repeated until ΔE is sufficiently small.

(7) The rough match generated in steps (1)–(6) correlates the calculated color of the batch paint versus the tristimulus values of the target paint. This is then iterated further to provide a closer match to the target paint values by calculating a new $D_k$ and $D_s$ matrix from the newly generated values of $K_i$, $S_i$ and $R_i$. The new $D_k$ and $D_s$ matrices generate a new matrix to be inverted for the ΔC calculation. The new C matrix is calculated and corrected by the ΔC matrix so that $C_{new} = C_{old} + \Delta C$. These iterations can be repeated until ΔE is sufficiently small.

The software program runs the foregoing equations for the selected metallic pigment with all three-colorant combinations of the colorants. Therefore, the software program produces a number of different colorant formulations. One of the colorant formulations is selected. This selection can be based on lowest cost, least metameric and/or lowest ΔE.

B. The batch paint is formulated using the selected colorant formulation and its reflectance is measured using the spectrophotometer 10. If the color of the batch paint is not close enough to the color of the target paint, the steps of (1)–(7) can then be repeated in the correction stage to determine the amount of colorants necessary to adjust the color from that of the formulated batch paint to the target paint, except that the fourth colorant will now be the final match to the calculated batch obtained from the iteration steps (1)–(7). The final C matrix can be converted to the volume and weight of colorant which must be added by:

$$\frac{\text{current pigment volume in batch now}}{1 - C_1 - C_2 - C_3} \times C = \text{pigment volume to add}$$

and $$100 \times \frac{\text{weight per gallon of colorant}}{\% \text{ concentration of pigment in colorant}} \times C_1 =$$

weight of each colorant $i$ to add

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of color matching a metallic paint to match a target metallic color within a specified color tolerance, which process comprises:
    providing a computer data base with
    (i) a library comprising the spectral characteristics of at least one black colorant, at least one non-black colorant, and at least one metallic pigment;
    (ii) a paint manufacturing formula;
    (iii) the number of colorants to use from the selected library; and
    (iv) the allowable degree of color variation;
    analyzing a sample of the target metallic color to identify the type of metallic pigment present in the target metallic color;
    selecting a metallic pigment from the library which is closest to the type of metallic pigment present in the target metallic color;
    obtaining the spectral curve of the target metallic paint utilizing a spectrophotometer or colorimeter;
    determining the quantities of colorants and metallic pigments to be incorporated into the paint manufacturing formula intended to provide a spectral curve which matches the spectral curve of target color within the allowable variation of color;
    producing a metallic paint incorporating the determined quantities of colorants and metallic pigments according to the paint manufacturing formula;
    comparing the spectral curve of the produced paint with that of the target color to determine if it is within the allowed variation;
    if the comparison of the spectral curve of the produced paint indicates it is not within the allowed color variation, repeating the shading steps until it is.

2. The process of claim 1, wherein the colorants are non-white.

3. The process of claim 1, wherein the metallic pigment present in the target metallic color is identified by microscopic analysis of the target metallic color.

4. The process of claim 1, wherein the spectrophotometer or colorimeter obtains the spectral curve of the target metallic paint from a single angle.

* * * * *